(12) United States Patent
DeMartine et al.

(10) Patent No.: US 7,926,771 B2
(45) Date of Patent: Apr. 19, 2011

(54) MOUNTING APPARATUS FOR MOUNTING OBJECTS TO SUPPORT STRUCTURES OF A TENT

(75) Inventors: Daniel DeMartine, Endicott, NY (US); John Douglas, Williamsburg, VA (US)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 12/608,558

(22) Filed: Oct. 29, 2009

(65) Prior Publication Data

US 2010/0108838 A1      May 6, 2010

Related U.S. Application Data

(60) Provisional application No. 61/110,413, filed on Oct. 31, 2008.

(51) Int. Cl.
*A47B 96/00* (2006.01)
(52) U.S. Cl. ............ 248/218.4; 248/229.13; 248/220.2; 248/229.23
(58) Field of Classification Search ............... 248/218.4, 248/229.1, 229.12, 229.13, 229.23, 229.22, 248/228.3, 228.4, 231.41, 231.51, 316.4, 316.5, 230.4, 229.2
See application file for complete search history.

(56) References Cited

U.S. PATENT DOCUMENTS

| | | | | | |
|---|---|---|---|---|---|
| 4,799,639 | A | * | 1/1989 | Riley | 248/228.4 |
| 5,478,041 | A | * | 12/1995 | Mayne | 248/514 |
| 5,758,870 | A | * | 6/1998 | Weaver | 269/329 |
| 5,863,021 | A | * | 1/1999 | Nichols | 248/229.23 |
| 5,984,248 | A | * | 11/1999 | Evans et al. | 248/214 |
| 6,283,425 | B1 | * | 9/2001 | Liljevik | 248/230.4 |
| 2002/0125388 | A1 | * | 9/2002 | Eslick | 248/230.4 |
| 2010/0288897 | A1 | * | 11/2010 | Chang | 248/229.22 |

* cited by examiner

*Primary Examiner* — Ramon O Ramirez
(74) *Attorney, Agent, or Firm* — Reinhart Boerner Van Deuren P.C.

(57) ABSTRACT

An apparatus for mounting objects to structural members of a tent is provided. The mounting apparatus comprises a pair of jaws, a jaw adjustment arrangement and an object mounting union. The pair of jaws are operably pivotally connected to one another. Each jaw includes an engaging portion for engaging the structural member of a tent frame. The engaging portions are in opposed relation to one another and define a mouth therebetween. The jaw adjustment arrangement operably adjustably limits a maximum width of the mouth. The object mounting union is used to secure an object to the pair of jaws.

15 Claims, 9 Drawing Sheets

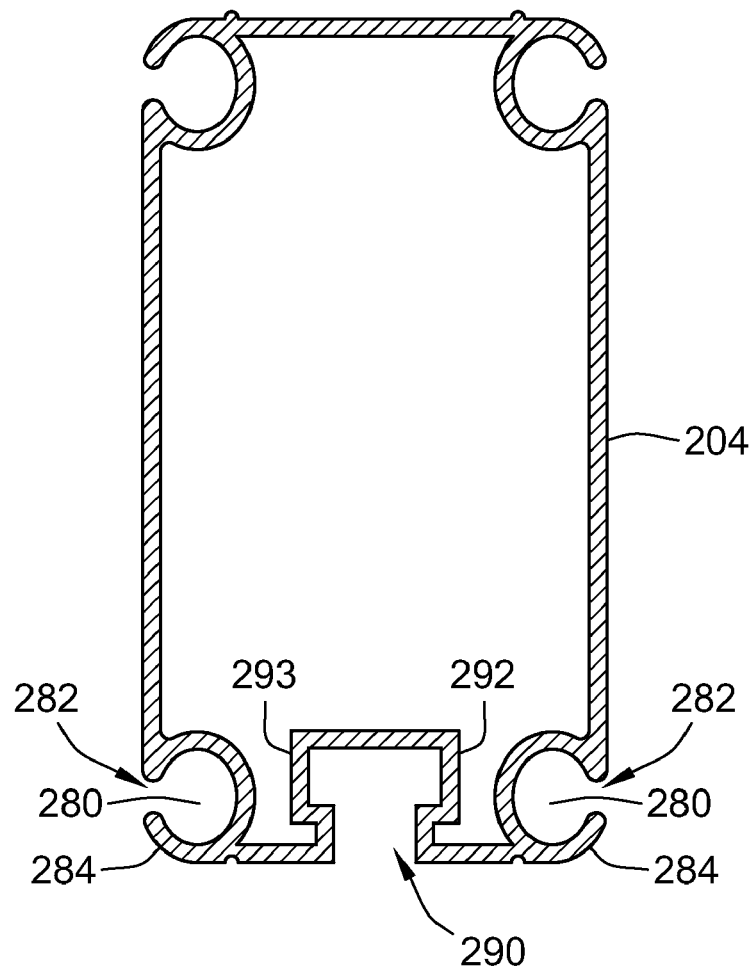
FIG. 5
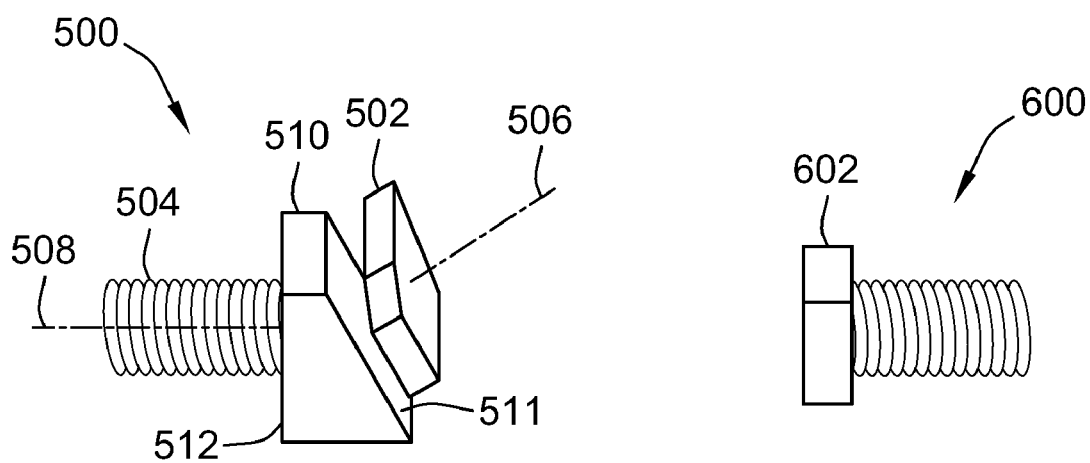
FIG. 8
FIG. 9

MOUNTING APPARATUS FOR MOUNTING OBJECTS TO SUPPORT STRUCTURES OF A TENT

CROSS-REFERENCE TO RELATED PATENT APPLICATION

This patent application claims the benefit of U.S. Provisional Patent Application No. 61/110,413, filed Oct. 31, 2008, the entire teachings and disclosure of which are incorporated herein by reference thereto.

FIELD OF THE INVENTION

This invention generally relates to tents and more particularly to mounting objects to support structures of tents.

BACKGROUND OF THE INVENTION

Tents can be very large and can be used for providing a shelter and environment for large gatherings and celebrations such as theatrical events, wedding receptions and conventions. For these large tents, a shell of the tent is typically supported by a frame. The frame typically includes structural members that combine to support the shell. Typically, the shell is formed from one or more fabric panels. The structural members may include vertical legs that define the walls of the tent and rafters that extend at an angle relative to the vertical legs toward a peak of the tent to define the roof.

As tents are used to provide shelter for all types of events, the tents are typically adorned with accessories such as lighting, sound systems, decorations, fans, banners and heaters, to name a few. However, assembly of the tent and hanging of these accessories has been time consuming and even frustrating.

Normally, as the structural members of the tent frame are continuous beams, cables, wire tires, bungee cords, or other attachment devices that are able to wrap around the structural members of the frame are required to attach the accessories to the structural members. However, the use of these attachment devices can be aesthetically unsatisfactory and may also compromise structural stability and integrity. Further, ease of assembly and adjustment of the location of the accessories relative to the structural members of the tent frame is also limited and difficult, particularly after the accessories have been mounted to the structural members.

The present invention provides improved mounting apparatuses that facilitate improved installation and re-orientation of objects and accessories hung or mounted to structural members of tents.

BRIEF SUMMARY OF THE INVENTION

The present invention provides improved mounting apparatuses for easily and quickly mounting objects to structural members (i.e. the frame) of tents. The mounting apparatuses are preferably designed for tool-less mounting. Further, the mounting apparatus are preferably easily removed from the structural members for easy installation and repositioning. Further embodiments provide force tightening where the load of the connected object acts to increase the engagement of the mounting apparatus with the cooperating structural member.

In one embodiment, an apparatus for mounting objects to structural members of a tent is provided. The mounting apparatus comprises a pair of jaws, a jaw adjustment arrangement and an object mounting union. The pair of jaws are operably pivotally connected to one another. Each jaw includes an engaging portion for engaging the structural member of a tent frame. The engaging portions are in opposed relation to one another and define a mouth therebetween. The jaw adjustment arrangement operably adjustably limits a maximum width of the mouth. The object mounting union is used to secure an object to the pair of jaws.

In a preferred embodiment, the jaws are configured to engage keder channels formed in the structural members.

In another embodiment, the jaws pivot relative to one another using clam-type action. In other embodiments, the jaws pivot relative to one another using scissor-type action.

In yet another aspect, the invention provides a mounting arrangement for mounting objects to structural members of a tent including a threaded body and a head portion. The head portion is operably coupled to the threaded body. The head is operably engageable with a channel formed by a structural member of a tent to prevent rotation of the threaded body. In a preferred embodiment, the head portion is skewed or oblique relative to the body portion. In a further preferred embodiment, the mounting arrangement further includes a mounting block that has a structural member abutment surface obliquely oriented relative to an object mounting surface.

In another aspect, the pair of jaws can include a first jaw and a second jaw, wherein each jaw includes two jaw profiles. The mounting apparatus further includes a adjustment nut interposed between the jaw profiles of the first jaw, and a mounting block interposed between the jaw profiles of the second jaw. In this embodiment, the jaw adjustment arrangement is threaded into the adjustment nut and extends through an aperture formed in the mounting block. The object mounting union attaches the object to the mounting block. Further, each of the jaw profiles can include a finger configured to engage a channel formed in the structural member In one embodiment, a mounting arrangement for mounting objects to structural members of a tent. The mounting arrangement includes a threaded body and a head portion that is operably coupled to the threaded body. The head portion is operably engageable with a channel formed by a structural member of a tent to prevent rotation of the threaded body.

In one aspect of this embodiment, the mounting arrangement includes a structural member of a tent having a channel which includes a narrowed mouth. The head portion is positioned within the channel and engaging the channel to prevent rotation of the threaded body. The threaded body extends through the mouth. In some embodiments, the threaded body and the head portion are oblique to one another. The mounting arrangement can also include a mounting block having a structural member abutment surface obliquely arranged relative to an object abutment surface.

In yet another embodiment, a mounting assembly for a tent is provided. The mounting assembly includes a structural member for supporting the tent and a mounting apparatus. The structural member includes a plurality of channels and the mounting apparatus includes a plurality of jaw profiles configured to engage the channels.

In one aspect of this embodiment, the plurality of jaw profiles define a mouth. The mounting apparatus further includes a jaw adjustment arrangement, which adjusts a maximum width of the mouth, and a object mounting union for securing an object to the jaw profiles.

In another aspect of this embodiment, each jaw profiles includes a finger configured to engage the channels. In some embodiments, the channels are keder channels and the finger is sized to fit the keder channels.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a simplified representative cross-sectional illustration of a structural member to which the mounting apparatus of FIG. 3 may be mounted;

FIG. 8 is a perspective view of a fifth embodiment of a mounting apparatus according to the teachings of the present invention usable with the structural member of FIG. 5;

FIG. 9 is a perspective view of a sixth embodiment of a mounting apparatus according to the teachings of the present invention usable with the structural member of FIG. 5;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
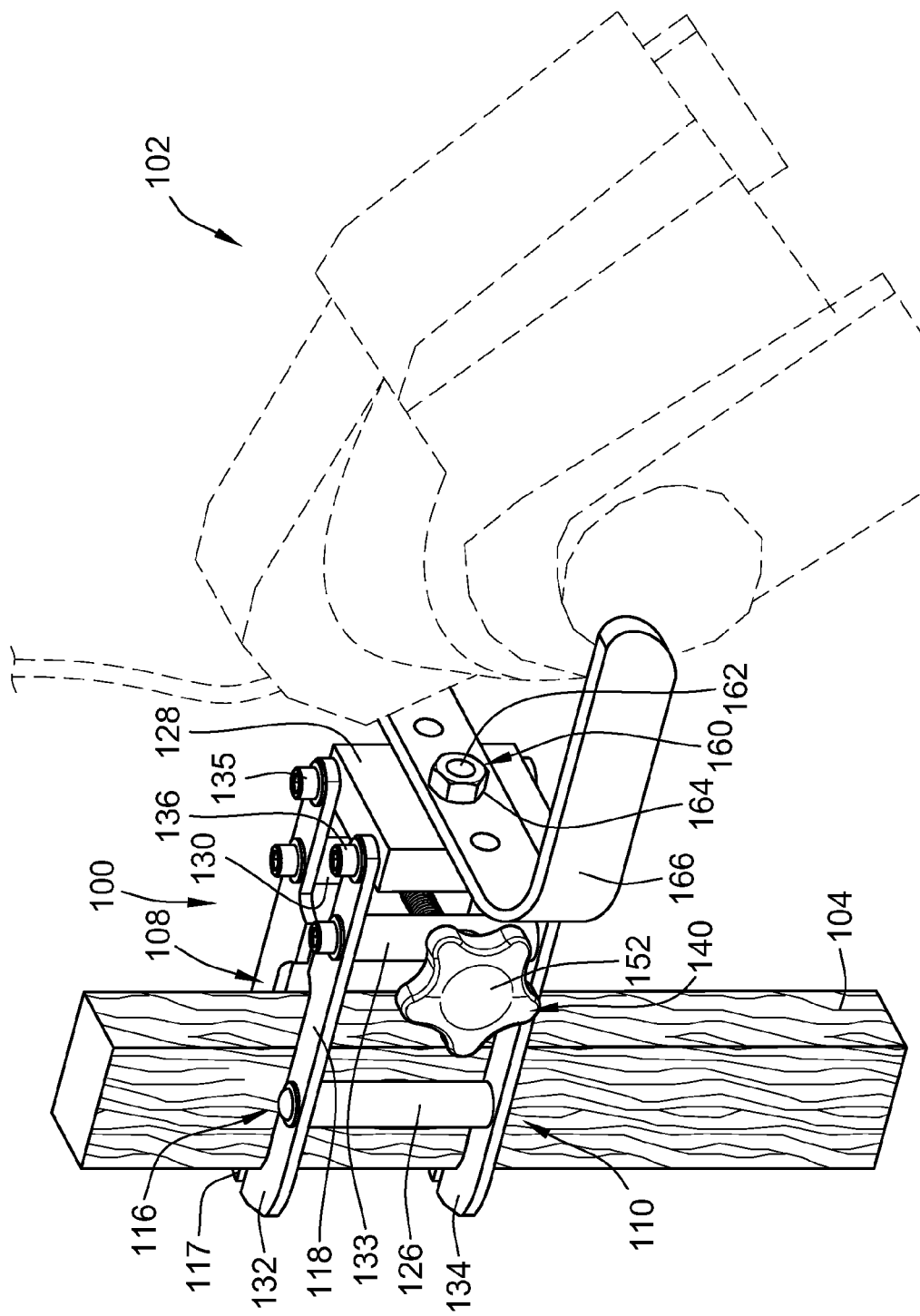
FIG. 1 is a perspective view of a first mounting apparatus mounted to a structural member of a tent according to the teachings of the present invention.

FIG. 1 illustrates one embodiment of a mounting apparatus 100 according to the teachings of the present invention mounting an object 102 to a structural member 104 of a tent. The mounting apparatus 100 allows a user to mount the object 102 (illustrated as light) anywhere along the length of the structural member 104. Further, the mounting apparatus 100 can be simply and quickly connected or disconnected to the structural member 104 to permit easy repositioning of the object 102

Figure 2:
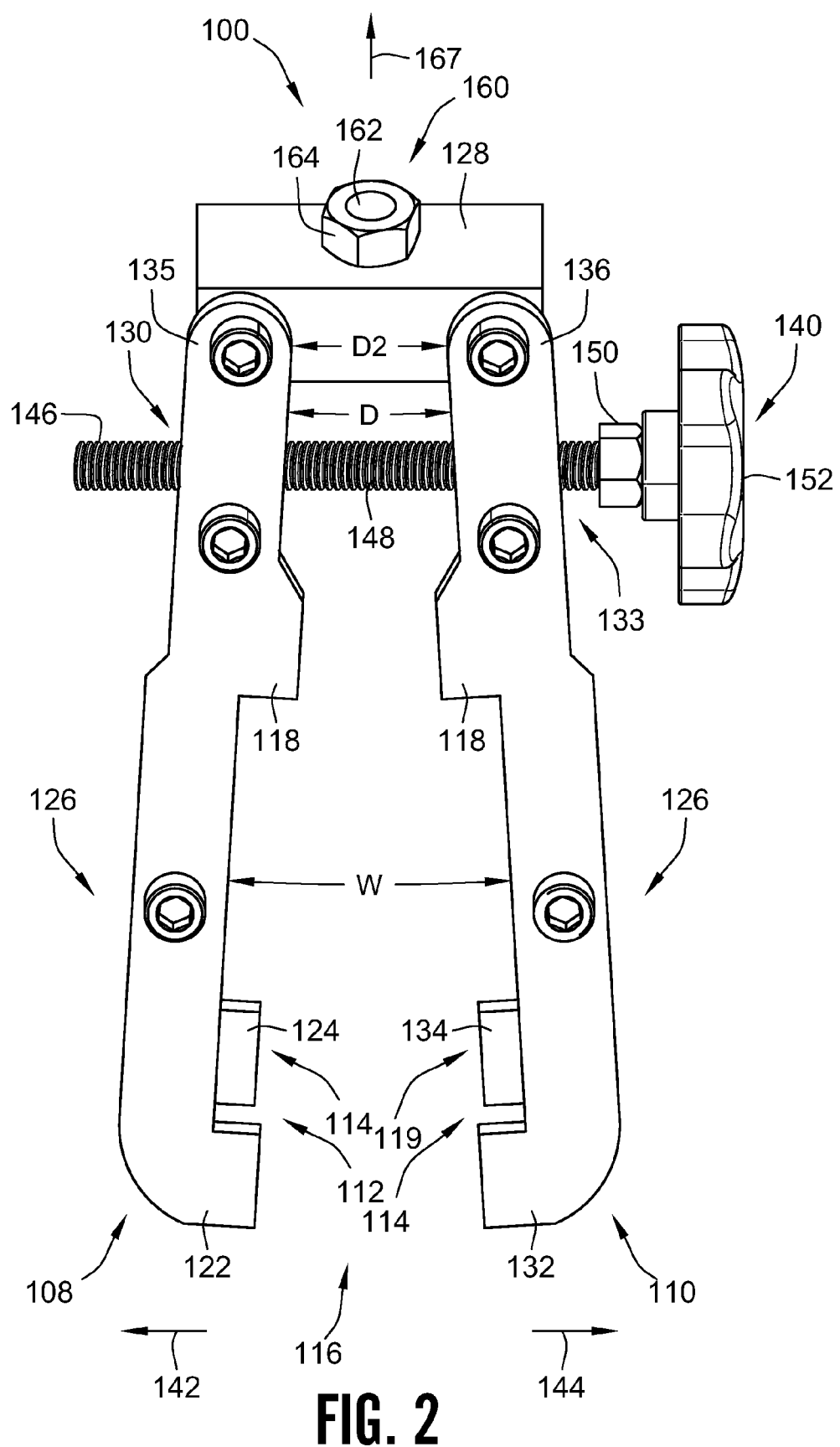
FIG. 2 is a perspective view of the mounting apparatus of FIG. 1.

As illustrated in FIG. 2, the mounting apparatus 100 includes a pair of jaws 108, 110 that define engaging portions 112, 114, respectively, for engaging structural members of the tent. The engaging portions 112, 114 are in opposed, generally mirrored, spaced relation defining a mouth region 116 therebetween. Depending on the desired application (i.e. the type of structural member to which the mounting apparatus 100 is designed to mount), the engaging portions 112, 114, and consequently mouth region 116, will have different profiles.

As illustrated in FIGS. 1 and 2, the mounting apparatus 100, and more particularly engaging portions 112, 114, are designed to engage a structural member 104 in the form a rectangular beam. Because the rectangular beam is free of grooves, the mouth region 116, and particularly engaging portions 112, 114 are configured to receive the longer sides of the structural member 104. The engaging portions 112, 114 have laterally inward extending abutments 117, 118 that define grooves 119 therebetween for receiving the structural member 104.

As shown, jaw 108 is formed from a pair of spaced apart jaw profiles 122, 124. The jaw profiles 122, 124 define engaging portion 112 and part of mouth region 116 of the mounting apparatus 100. The jaw profiles 122, 124 are spaced apart laterally from one another so as to provide lateral stability and prevent twisting of the mounting apparatus 100 relative to structural member 104.

Several spacer structures facilitate spacing and connecting the two jaw profiles 122, 124 relative to one another. A first spacer 126 spaces the two jaw profiles 122, 124 proximate engaging portion 112. Mounting block 128 spaces the two jaw profiles 122, 124 at an opposite end thereof. A further spacing structure, adjustment nut 130, is interposed between mounting block 128 and spacer 126.

Jaw 110 is substantially similar to mounting jaw 108 and includes jaw profiles 132, 134. However, rather than including an adjustment nut 130, jaw 110 includes a slide block 133 that is positioned between and is pivotally connected to jaw profiles 132 and 134

Jaws 108, 110 operably pivot relative to one another via hinges 135, 136 between the mounting block 128 and jaws 108 and 110, respectively. Hinges 135, 136 are provided by screws passing through apertures in jaw profiles 122, 124, 132, 134 and threaded into mounting block 128.

The mounting apparatus 100 includes a jaw adjustment arrangement 140 that limits the lateral width W of mouth region 116. In other words, the jaw adjustment arrangement 140 limits the ability of jaws 108, 110 to pivot way from one another, such as illustrated by arrows 142, 144, via hinges 135, 136. The jaw adjustment arrangement 140 includes an adjustment mechanism 146 that threadedly engages adjustment nut 130. Depending on the direction of threading, the adjustment mechanism 146 can permit mouth region 116 to expand wider or narrower.

The adjustment mechanism 146 in the illustrated embodiment includes a threaded shaft 148 that threadedly engages adjustment nut 130 and extends through an aperture in slide block 133. Preferably, the aperture is larger in size than the threaded shaft 148 such that the threaded shaft 148 is axially free-floating in the aperture. The adjustment mechanism 146 also includes an abutment block 150 that is larger than the aperture in slide block 133 and abuts against an outer face of slide block 133. Slide block 133 is axially positioned between the adjustment nut 130 and the abutment block 150. In this arrangement, as the adjustment mechanism 146 is threaded into adjustment nut 130, the adjustment mechanism 146 forces the two jaws 108, 110 toward one another by forcing abutment block 150 into slide block 133. As this occurs, preferably, jaws 108, 110 rotate equally, in opposite rotational directions, about their corresponding hinges 135, 136, respectively.

To assist threading the adjustment mechanism 146 to adjust the width W of mouth region 116, a knob 152 is rotationally fixedly secured to threaded shaft 148. The knob 152 and threads of threaded shaft 148 are configured such that the adjustment of the mounting apparatus 100 is tool-less. More particularly, a user need not use tools to tighten or loosen jaws 108, 110 relative to a structural member 104. Instead, the installer can simply adjust the adjustment mechanism 146 by gripping the knob 152 by hand.

Preferably, adjustment nut 130 and slide block 133 are pivotally connected between corresponding jaw profiles 122, 124 and 132, 134, respectively. This arrangement allows the adjustment nut 130 and slide block 133 to rotate relative to the corresponding jaw profiles 122, 124, 132, 134 as the adjustment mechanism 146 is threaded in and out of adjustment nut 130. The rotation is desired because as adjustment mechanism 146 is threaded in and out to adjust width W this action will cause the jaw profiles 122, 124, 132, 134 to rotate about hinges 135, 136. However, as the jaw profiles 122, 124, 132, 134 rotate this action also causes them to change their angle relative to adjustment mechanism 146. Without permitting rotation of adjustment nut 130 and slide block 133, the adjustment mechanism 146 would bind, thereby inhibiting adjustment of the mounting apparatus 100. In this embodiment, adjustment mechanism 146 remains substantially parallel to mounting block 128 during adjustment of jaws 108, 110.

The mounting block 128 includes an object mounting union 160 for operably connecting the mounting apparatus 100 to an object. The mounting union of this embodiment is a threaded stud shaft 162 that includes a cooperating nut 164. With reference to FIG. 1, the stud shaft 162 passes through an aperture in frame member 166 of the object 102. Typically, a user will use a wrench, or other tool, to tighten nut 164 to secure frame member 166, and consequently object 102, to the mounting block 128.

Once the object 102 is operably secured to the mounting apparatus 100, the installer can easily mount the object 102 to structural member 104 as discussed previously. Further, although a tool may be required to connect the object 102 to the mounting apparatus 100, this operation can be done on the ground without the requirement of using tools on a ladder or elevated in the air. When the installer is mounting the mounting apparatus 100, the installer, as discussed previously, will not need any tools and can use knob 152 to secure the mounting apparatus 100 to structural member 104.

In this embodiment, jaw profiles 122, 132, which face one another, are on a same plane with one another. Similarly, jaw profiles 124, 134, which face one another, are also on a same plane with one another.

Further, the distance D2 between the axis of rotation defined by hinges 135, 136 is preferably configured such that mounting apparatus 100 is load engaging. When a load is applied to mounting apparatus 100 along arrow 167, the jaws 108, 110 tend to increase their engagement with structural member 104 due to the load being applied.

Figure 3:
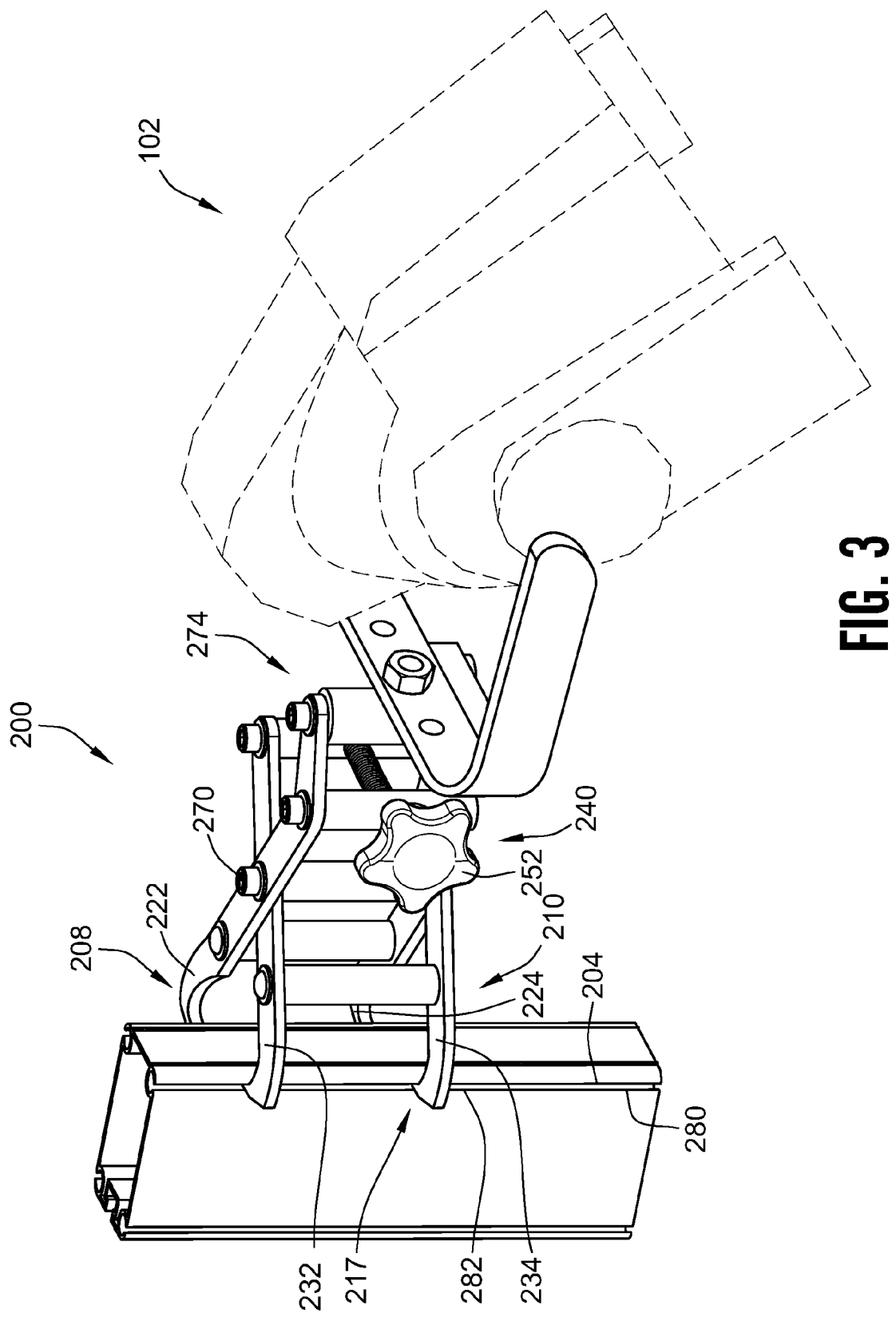
FIG. 3 is a perspective view of a second mounting apparatus mounted to a structural member of a tent according to the teachings of the present invention.
Figure 4:
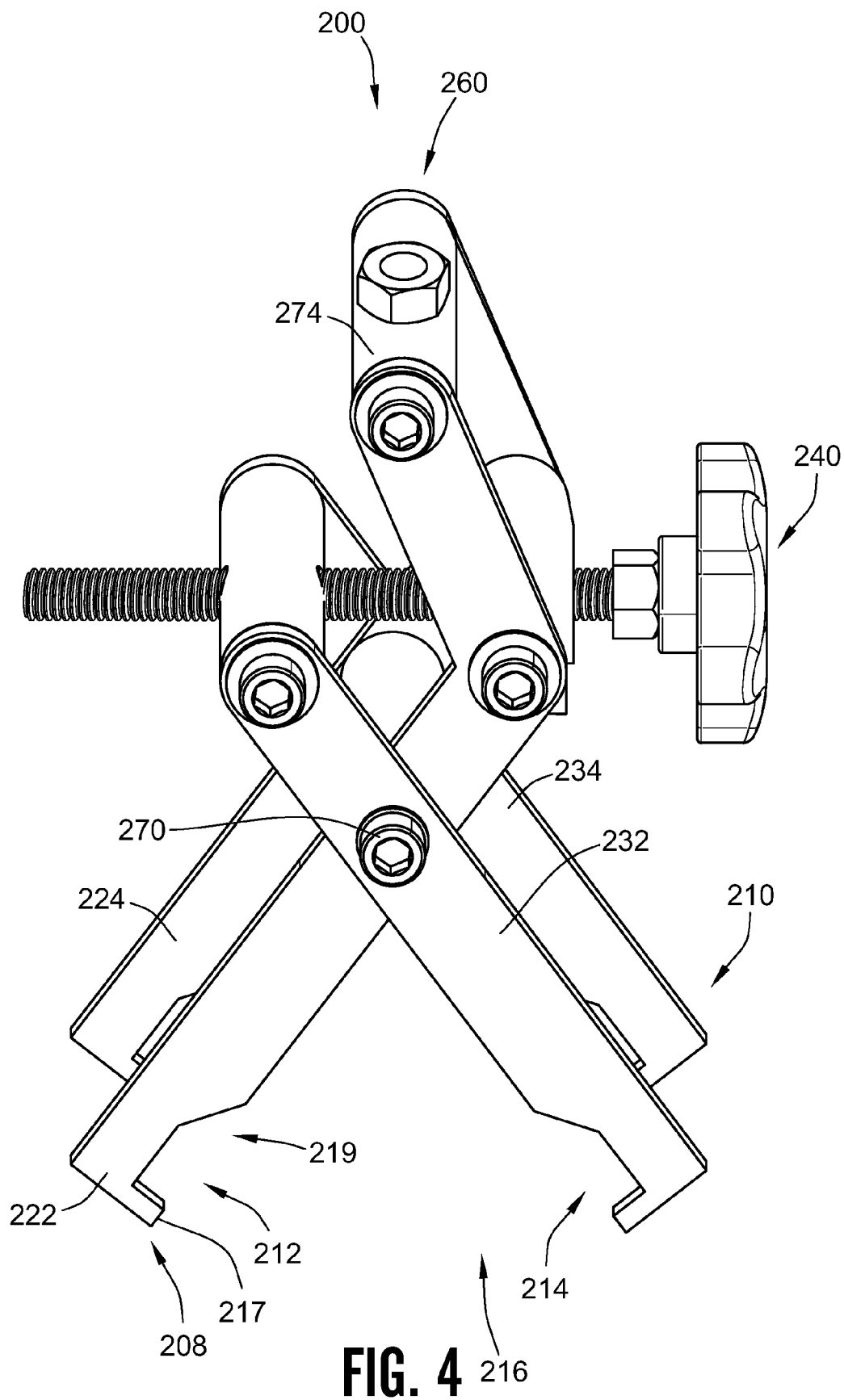
FIG. 4 is a perspective view of the mounting apparatus of FIG. 3.

FIGS. 3 and 4 illustrate an alternative embodiment of a mounting apparatus 200 according to the teachings of the present invention. This embodiment includes a pair of jaws 208, 210 that pivot relative to one another and include an adjustment arrangement 240 for limiting the motion of the two jaws 208, 210 relative to one another. Jaws 208, 210 are formed from pairs of jaw profiles 222, 224 and 232, 234, respectively. Again, each jaw 208, 210 defines an engagement portion 212, 214, and mouth region 216 therebetween, for interacting with a structural member 204 of a tent and an object 102.

One first difference from the prior embodiment is the configuration of the engagement portions 212, 214. This embodiment is designed to engage keder channels 280 of structural member 204 rather than extend around the entire periphery, such as in the prior embodiment. Thus, this embodiment includes fingers 217 that are sized to pass through the mouth portion 282 of the keder channels 280 to engage the structural member 204. Again, each engaging portion 212, 214 defines a groove 219. However, the groove 219 is much smaller in length and is only sized to receive wall portion 284 defining half of keder channel 280. FIG. 5 illustrates an embodiment of structural member 204 in cross-section illustrating keder channels 280 and corresponding structure.

Another difference from the prior embodiment is the pivoting action of the two jaws 208, 210. Unlike the clam shell pivoting action of jaws 108, 110 of the prior embodiment, jaws 208, 210 pivot about a central hinge 270 using scissoring action. Thus, in this embodiment, the hinge 270 is positioned between adjustment arrangement 240 and engagement portions 212, 214, unlike the prior embodiment, where the adjustment arrangement 140 is positioned between hinges 135, 136 and engagement portions 112, 114.

By having a scissor arrangement, jaw profiles 222, 232 as well as 224, 234 over lap one another at hinge 270. More particularly, jaw profiles 232, 234 of jaw 210 are laterally interposed between jaw profiles 222, 224.

Mounting block 274 is different than mounting block 128 of the previous embodiment in that it is only coupled to jaw 208 and does not provide any structure for permitting jaws 208 and 210 to pivot relative to one another. Mounting block 274 again includes a mounting union 260 for securing an object 102 to the mounting apparatus 200. Further, the orientation of mounting block 274 can be adjusted relative to jaw 208 to permit additional adjustment of the overall orientation of object 102 relative to structural member 204.

Figure 6:
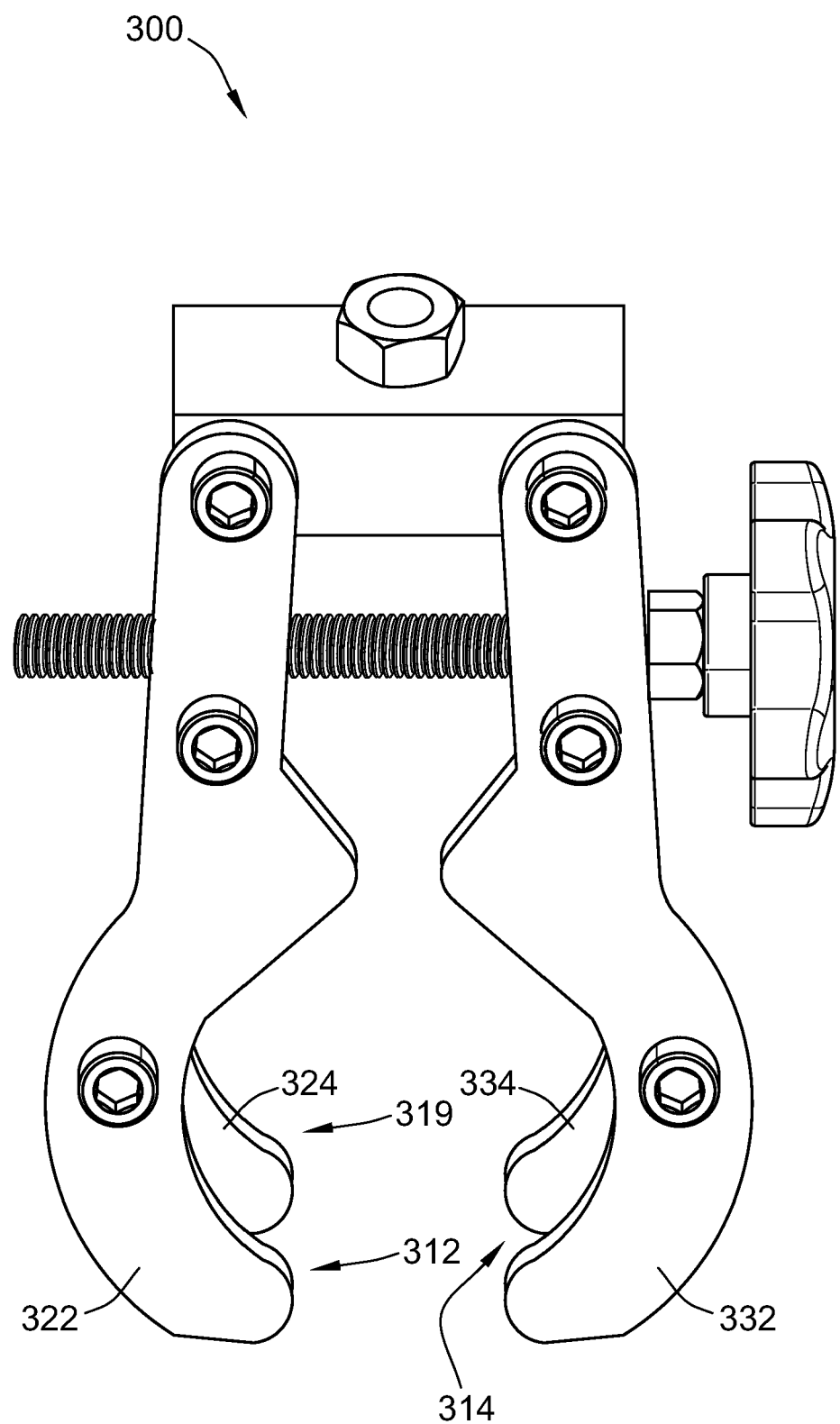
FIG. 6 is a perspective view a third embodiment of a mounting apparatus according to the teachings of the present invention.

FIG. 6 illustrates a further embodiment of a mounting apparatus 300 according to the teachings of the present invention. This embodiment is substantially similar to mounting apparatus 100, except for the type of structural member to which it is designed to mount. Thus, like numbers of this embodiment have the same function as like numbers for the embodiment in FIGS. 1 and 2. Only those differences between the two embodiments will be described.

Mounting apparatus 300 is designed to mount to a round or oval structural member. Thus, engaging portions 312, 314 have a curved groove 319. This curved groove 319 is configured to cooperate with a corresponding curved profile of the structural member. To maintain structural strength in the jaw profiles 322, 324, 332, 334, the jaw profiles 322, 324, 332, 334 are arcuate in shape to define the curved grooves 319, rather than merely cutting the groove 319 into the jaw profiles 322, 324, 332, 334. This prevents weakening of the jaw profiles 322, 324, 332, 334 at the apex of the curved grooves 319.

Figure 7:
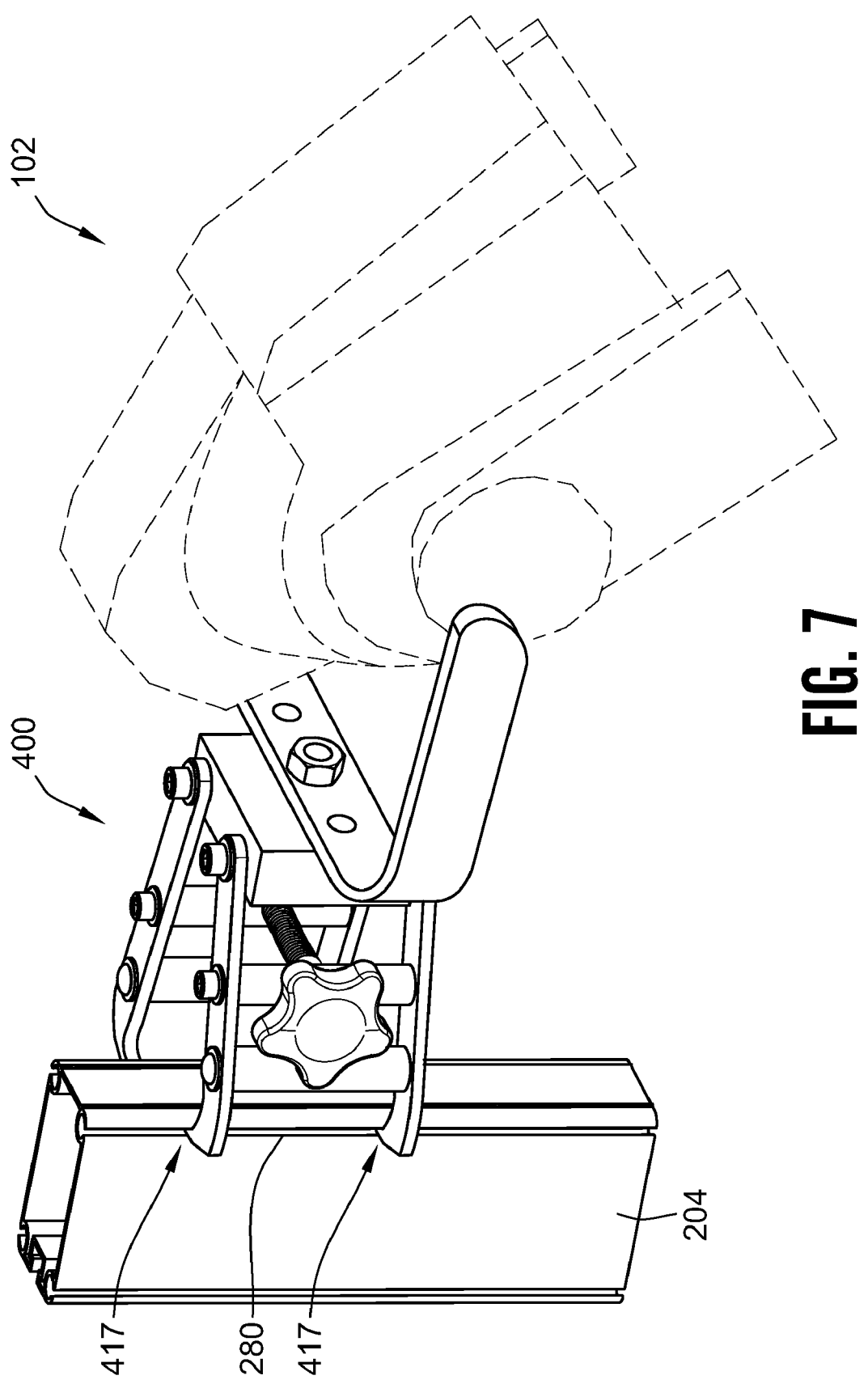
FIG. 7 is a perspective view of a fourth embodiment of a mounting apparatus mounted to a structural member of a tent according to the teachings of the present invention.

FIG. 7 illustrates a further embodiment of a mounting apparatus 400 according to the teachings of the present invention. This embodiment incorporates features of mounting apparatus 100 and mounting apparatus 200. More particularly, mounting apparatus 400 operates based on clam-type action (similar to mounting apparatus 100) but includes fingers 417 that operably engage keder channels 280 (similar to mounting apparatus 200).

Figure 10:
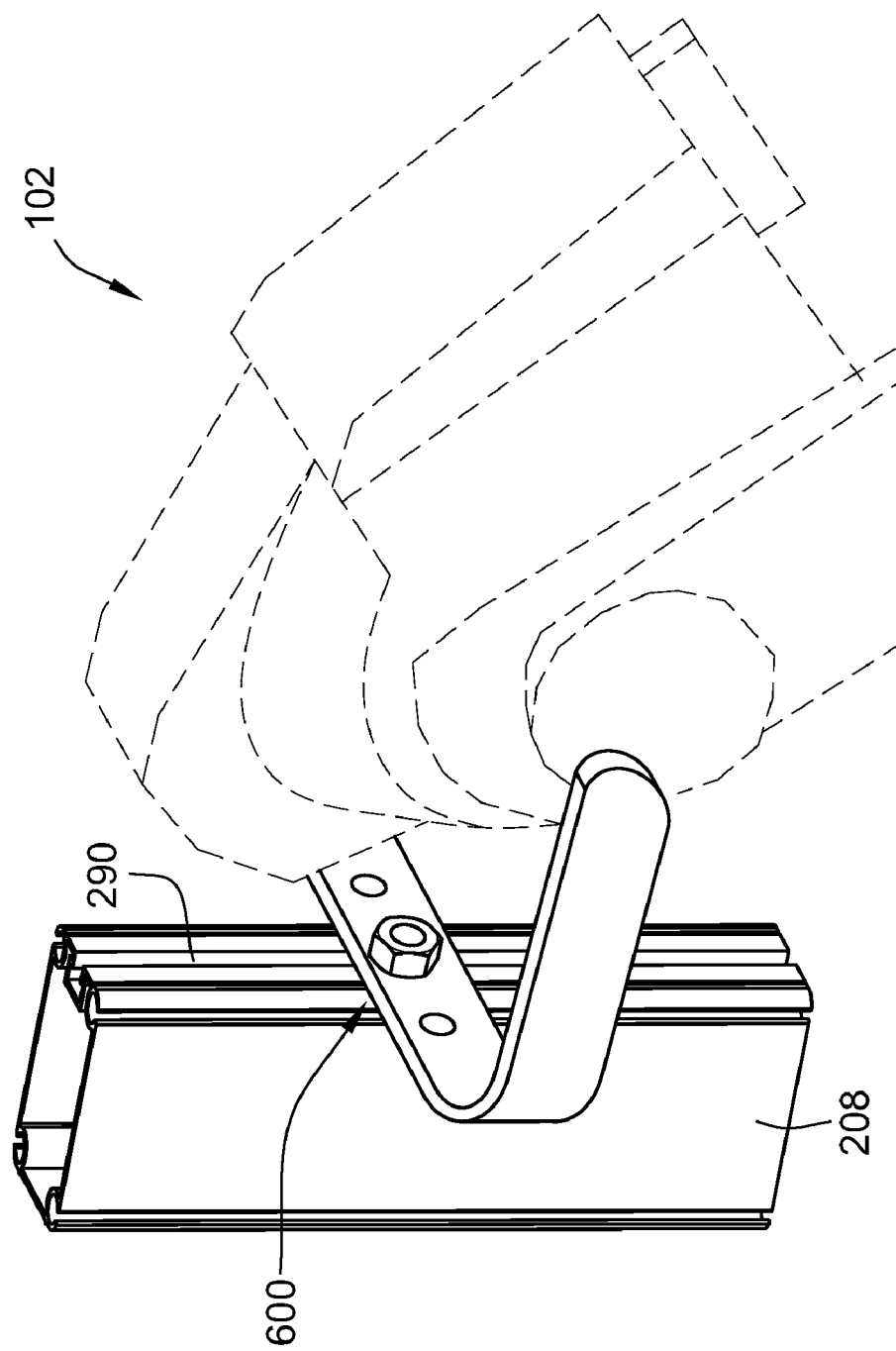
FIG. 10 is a perspective view of the mounting apparatus of FIG. 9 in use with a corresponding structural member.

FIGS. 8 and 9 provide two further mounting apparatuses 500 and 600 respectively. These mounting apparatuses 500, 600 are bolts that include a head portion 502, 602 configured to mount within utility channel 290 of structural member 204 (see FIGS. 5 and 10). The head portions 502, 602 are configured to engage walls 292, 293 to prevent rotation of head portions 502, 602.

Mounting apparatus 500 is bent such that head portion 502 is angled relative to a body portion 504 of the bolt. More particularly, head portion defines an abutment surface in a plane that is perpendicular to axis 506. Body portion 504 is co-axial with axis 508. Axes 506 and 508 are skewed relative to one another. This skewed relationship allows the mounting apparatus 500 to be used with a rafter or other roof structural member that is skewed relative to horizontal, i.e. to provide the pitch of the roof. This allows the body portion 504 to be aligned substantially horizontal or vertical, depending on the desired orientation, even though it is interacting with a skewed structural member.

Further, mounting apparatus 500 includes a mounting block 510 that has a skewed mounting structure abutment surface 511 that abuts against a surface of the structural member, which is skewed relative to horizontal and vertical, and an object abutment surface 512 against which an object is biased when mounted to the structural member. The object abutment surface 512 will be either horizontal or vertical when in use. Thus, the mounting block 510 is wedge shaped. Surface 511 is perpendicular to axis 506 and surface 512 is perpendicular to axis 508.

Figure 11:
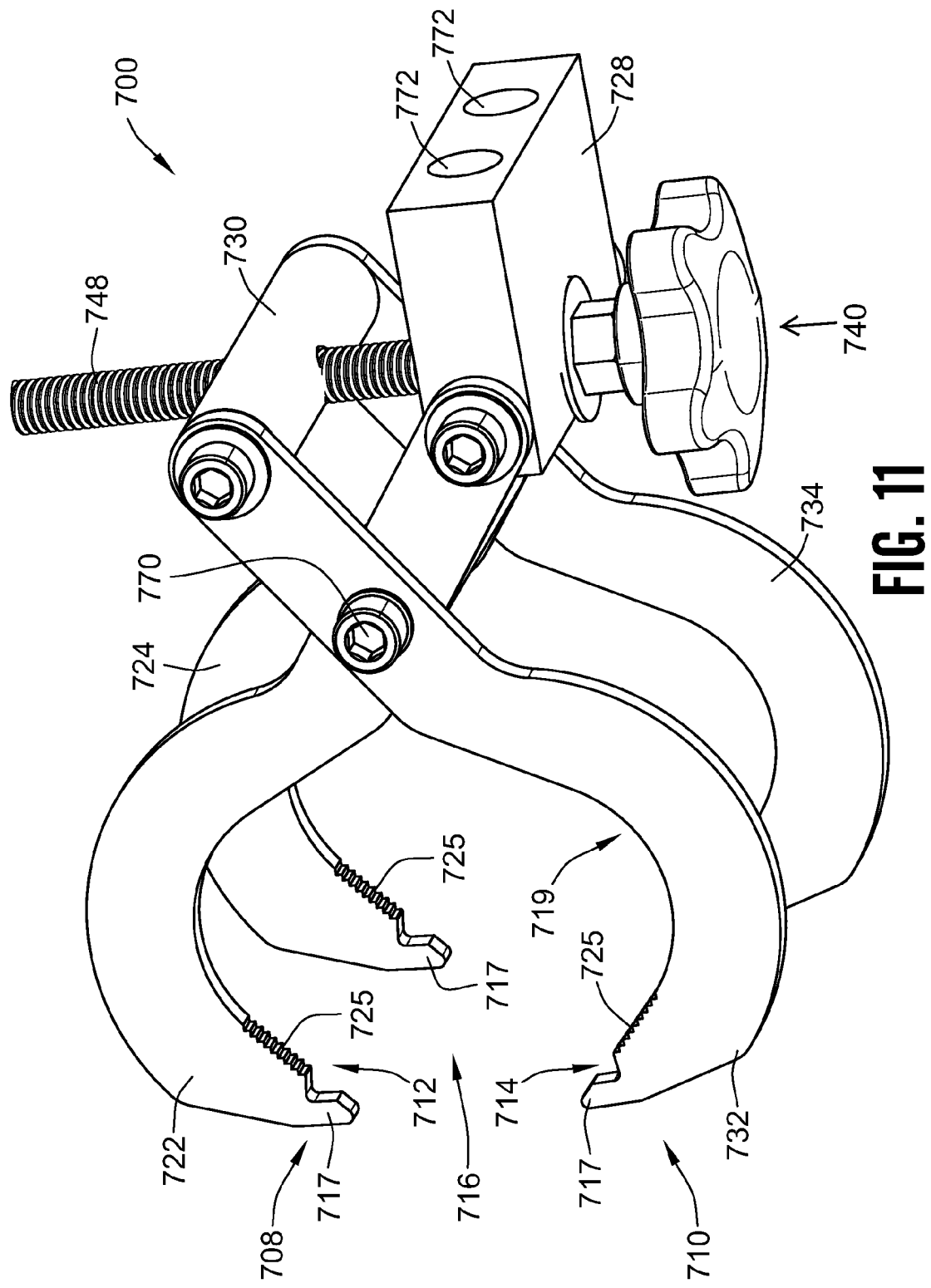
FIG. 11 is a perspective view of a seventh embodiment of a mounting apparatus according to the teachings of the present invention.

FIG. 11 shows yet another embodiment of a mounting apparatus 700 according to the teachings of the present invention. The mounting apparatus 700 includes a pair of jaws 708, 710 that pivots relative to one another and an adjustment arrangement 740 for limiting the motion of the jaws 708, 710 relative to one another. Each of the jaws 708, 710 includes a pair of jaw profiles 722, 724 and 732, 734, respectively. As it was with previous embodiments, each of the jaws 708, 710 defines an engagement portion 712, 714, a mouth region 716 therebetween.

The mounting apparatus 700 is a universal mounting apparatus that can engage different types of structural members. As shown, the engagement portions 712, 714 have a curved groove 719 similar to the engagement portions 312, 314 of the mounting apparatus 300. As such, the mounting apparatus 700 can be mounted to a round or oval structural member. Further, the each of the jaw profiles 722, 724, 732, 734 includes fingers 717 similar to the mounting apparatus 200. Thus, the mounting apparatus 700 can also be mounted to various shaped structural members having keder channels. For example, the mounting apparatus 700 can engage the structural member 204 shown in FIGS. 3 and 5. The fingers 217 are sized to pass through the mouth portion 282 of the keder channels 280. Each of the jaw profiles 722, 724, 732, 734 also includes a plurality of teeth 725 to improve a grip.

The pair of jaws 708, 710 pivot about a central hinge 770 using scissoring action. As it was with the mounting apparatus 200, the hinge 770 is positioned between the adjustment arrangement 740 and engagement portions 712, 714. By having a scissor arrangement, the jaw profiles 722 and 732 overlap one another at hinge 770. Similarly, the jaw profiles 724 and 734 overlap one another at hinge 770. In the embodiment shown in FIG. 11, the jaw profiles 722, 724 of the jaw 708 are laterally interposed between the jaw profiles 732, 734 of the jaw 710. In other embodiments, the jaw profiles may be arranged in different lateral positions, for example, the jaw profiles 732, 734 may be laterally interposed between the jaw profiles 722, 724.

The mounting apparatus 700 also includes a mounting block 728 and an adjustment nut 730. The adjustment nut 730 is interposed between the jaw profiles 732, 734 and spaces the two jaw profiles 732, 734. The mounting block 728 is interposed between the jaw profiles 722, 724 and spaced the two jaw profiles 722, 724. The mounting block 728 includes two apertures 772 for operably connecting the mounting apparatus 700 to an object using an object mounting union. For example, threaded stud shafts including a cooperating nut as in the embodiment of FIG. 1 may be used to connect an object to the mounting block 728. In other embodiments, the mounting block 728 may include one aperture or more than two apertures. Further, the apertures may or may not be threaded depending on a design of an object mounting union.

In this embodiment, the adjustment arrangement 740 includes a threaded shaft 748 that threadedly engages the adjustment nut 730 and extends through an aperture in the mounting block 728. As it was with other embodiments, the adjustment arrangement 740 forces the two jaws 708, 710 toward one another as the threaded shaft 748 is threaded into the adjustment nut 730.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for mounting objects to structural members of a tent, the mounting apparatus comprising:
   a pair of jaws operably pivotally connected to one another, each jaw including an engaging portion for engaging a structural member of a tent frame, the engaging portions being in opposed relation to one another and defining a mouth therebetween;
   a jaw adjustment arrangement operably adjustably limiting a maximum width of the mouth;
   an object mounting union for securing an object to the pair of jaws; and
   further including a mounting block defining the object mounting union.

2. The apparatus of claim 1, wherein the mounting block provides at least one pivot point permitting the jaws to operably pivot relative to one another.

3. An apparatus for mounting objects to structural members of a tent, the mounting apparatus comprising:
- a pair of jaws operably pivotally connected to one another, each jaw including an engaging portion for engaging a structural member of a tent frame, the engaging portions being in opposed relation to one another and defining a mouth therebetween;
- a jaw adjustment arrangement operably adjustably limiting a maximum width of the mouth;
- an object mounting union for securing an object to the pair of jaws; and
- wherein the adjustment arrangement includes an adjustment nut operably coupled to a first one of the jaws and an abutment block operably coupled to a second one of the jaws and a threaded adjustment mechanism cooperating with the adjustment nut and abutment block to limit the movement of the first and second jaws relative to one another.

4. The apparatus of claim 3, wherein the pair of jaws pivot relative to one another via a clam arrangement.

5. The apparatus of claim 3, wherein the pair of jaws pivot relative to one another via a scissor arrangement.

6. The apparatus of claim 3, wherein adjustment nut and abutment block pivot relative to their corresponding jaws.

7. The apparatus of claim 6, wherein the abutment block is in the form of a slide block through which the adjustment mechanism axially extends and axially floats.

8. The apparatus of claim 7, wherein the adjustment arrangement provides for tool-less adjustment of the width of the mouth.

9. An apparatus for mounting objects to structural members of a tent, the mounting apparatus comprising:
- a pair of jaws operably pivotally connected to one another, each jaw including an engaging portion for engaging a structural member of a tent frame, the engaging portions being in opposed relation to one another and defining a mouth therebetween;
- a jaw adjustment arrangement operably adjustably limiting a maximum width of the mouth;
- an object mounting union for securing an object to the pair of jaws; and
- wherein the pair of jaws includes a first jaw and a second jaw; the first jaw including a first jaw profile and a second jaw profile, and a second jaw including a third jaw profile and a fourth jaw profile; and further including an adjustment nut interposed between the first jaw profile and the second jaw profile, and a mounting block interposed between the third jaw profile and the fourth jaw profile; wherein the jaw adjustment arrangement is threaded into the adjustment nut and extends through an aperture formed in the mounting block.

10. The apparatus of claim 9, wherein the object mounting union attaches the object to the mounting block.

11. The apparatus of claim 9, wherein each of the first, second, third and fourth jaw profiles includes a finger configured to engage a channel formed in the structural member.

12. A mounting assembly for a tent, the mounting assembly comprising:
- a structural member supporting the tent, the structural member including a plurality of channels; and
- a mounting apparatus comprising:
  - a pair of jaws operably pivotally connected to one another, each jaw including an engaging portion for engaging a structural member of a tent frame, the engaging portions being in opposed relation to one another and defining a mouth therebetween, the pair of jaws;
  - a jaw adjustment arrangement operably adjustably limiting a maximum width of the mouth;
  - an object mounting union for securing an object to the pair of jaws; and
  - wherein the adjustment arrangement includes an adjustment nut operably coupled to a first one of the jaws and an abutment block operably coupled to a second one of the jaws and a threaded adjustment mechanism cooperating with the adjustment nut and abutment block to limit the movement of the first and second jaws relative to one another.

13. The mounting assembly of claim 12, wherein each of the jaws include a finger configured to engage the channels.

14. The mounting assembly of claim 12, wherein the plurality of channels are keder channels and the finger is sized to fit the keder channels.

15. The mounting assembly of claim 12, wherein the jaws are configured to engage the channels.

* * * * *